(12) United States Patent
Jones et al.

(10) Patent No.: US 9,721,285 B2
(45) Date of Patent: Aug. 1, 2017

(54) FACILITATION OF AUTHORIZED IN-STORE PICKUP IN CONJUNCTION WITH ONLINE ORDERING

(71) Applicant: HOME DEPOT PRODUCT AUTHORITY, LLC, Atlanta, GA (US)

(72) Inventors: Mary B. Jones, Powder Springs, GA (US); Jenna Floyd, Smyrna, GA (US); Ashley Yancey, Dacula, GA (US); Carly Westcott, Atlanta, GA (US); Emily Knox, Smyrna, GA (US); Shannon Chister, Canton, GA (US); Reid Tarentino, Mableton, GA (US); Sastry Akella, Marietta, GA (US); Nathan Hawk, Marietta, GA (US); Brandon Knox, Smyrna, GA (US); Christopher Nuckles, Austell, GA (US); Todd Stormes, Canton, GA (US); Angie Brown, Mableton, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 942 days.

(21) Appl. No.: 13/843,488

(22) Filed: Mar. 15, 2013

(65) Prior Publication Data
US 2014/0279238 A1 Sep. 18, 2014

(51) Int. Cl.
*G06Q 30/06* (2012.01)
*G06Q 30/08* (2012.01)

(52) U.S. Cl.
CPC .................. *G06Q 30/0617* (2013.01)

(58) Field of Classification Search
CPC .................. G06Q 30/06; G06Q 30/08
USPC .................. 705/26.1, 27.1
See application file for complete search history.

(56) References Cited

U.S. PATENT DOCUMENTS

| | | | |
|---|---|---|---|
| 2002/0026374 A1* | 2/2002 | Moneymaker | G06Q 20/02 705/26.2 |
| 2009/0089185 A1* | 4/2009 | Noures | G06Q 10/08 705/26.1 |

OTHER PUBLICATIONS

Classified ad 4—no title (May 29, 1852. New York Daily Times (1851-1857).*

(Continued)

*Primary Examiner* — James Zurita
(74) *Attorney, Agent, or Firm* — Greenberg Traurig, LLP

(57) ABSTRACT

Technologies are described herein for the facilitation of authorized in-store pickup in conjunction with online ordering. A request to process an order of an item selected by a customer and placed through a website may be received. The website may be transformed to a cart fulfillment web page including a fulfillment interface. Through the fulfillment interface, a selection of an option for in-store pickup by a third party may be received from the customer. Through the fulfillment interface, identifying information regarding the third party, pickup details associated with the in-store pickup of the item by the third party, and a preferred notification method for contacting the third party may also be received from the customer. An authorization pickup record related to the in-store pickup of the item by the third party may be generated. The authorization pickup record may be transmitted to the third party via the preferred notification method.

8 Claims, 5 Drawing Sheets

(56) References Cited

OTHER PUBLICATIONS

Bidwell, Percy W, Imports in the American Economy, Foreign Affairs (pre-1986); Oct. 1945; 24, 000001; ProQuest Central, pp. 85-98, total 14 pages.*

Martin, Thomas, Ancient Greece: from prehistoric to Hellenistic Times, Yale University, 1996. pp. 11-12, total 2 pages.*

* cited by examiner

FACILITATION OF AUTHORIZED IN-STORE PICKUP IN CONJUNCTION WITH ONLINE ORDERING

BACKGROUND

An entity may offer a variety of ways to purchase an item. For example, an entity may have a brick-and-mortar location where a customer can purchase the item in-store. The entity may also have a website where the customer can place an order online for the item. Typically, when the customer orders online, the customer receives delivery of the item at the customer's address. However, there may be instances where the customer who places the order online may want immediate possession of the item rather than wait sometimes several days for delivery. In such instances, the merchant may offer a service whereby the customer can pick up the item in-store after placing the order online.

In some cases, a customer may be unable to pick up items that are purchased online and designated to be picked up in-store. For example, the customer may purchase heavy materials (e.g., lumber) for a do-it-yourself project. The customer may not have the necessary vehicle to transport the materials and/or may be physically unable to carry the materials. In such cases, the customer may designate an authorized party to pick up the materials. However, by enabling the authorized party to pick up the customer's materials, the merchant may be opening itself to the possibility of theft when a non-authorized party picks up the materials instead.

It is with respect to these considerations and others that the disclosure made herein is presented.

SUMMARY

The present disclosure generally relates to technologies configured to facilitate authorized in-store pickup in conjunction with online ordering. According to some example technologies, a method for facilitating authorized in-store pickup in conjunction with online ordering is provided. According to the method, a request to process an order placed through a website may be received. The order may include an item selected by a customer. In response to receiving the request, the website may be transformed to a cart fulfillment web page. The cart fulfillment web page may include a fulfillment interface.

Through the fulfillment interface, a selection of an option for in-store pickup by a third party may be received from the customer. Through the fulfillment interface, identifying information regarding the third party, pickup details associated with the in-store pickup of the item by the third party, and a preferred notification method for contacting the third party may also be received from the customer. In response to receiving the identifying information, the pickup details, and the preferred notification method, an authorization pickup record related to the in-store pickup of the item by the third party may be generated. The authorization pickup record may be transmitted to the third party via the preferred notification method.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated Figures.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE FIGURES

The foregoing and other features of this disclosure will become more fully apparent from the following Detailed Description and appended claims, taken in conjunction with the accompanying Figures. Understanding that these Figures depict only several embodiments in accordance with the disclosure and are, therefore, not to be considered limiting of its scope, the disclosure will be described with additional specificity and detail through use of the accompanying Figures, in which:

DETAILED DESCRIPTION

Figure 1:
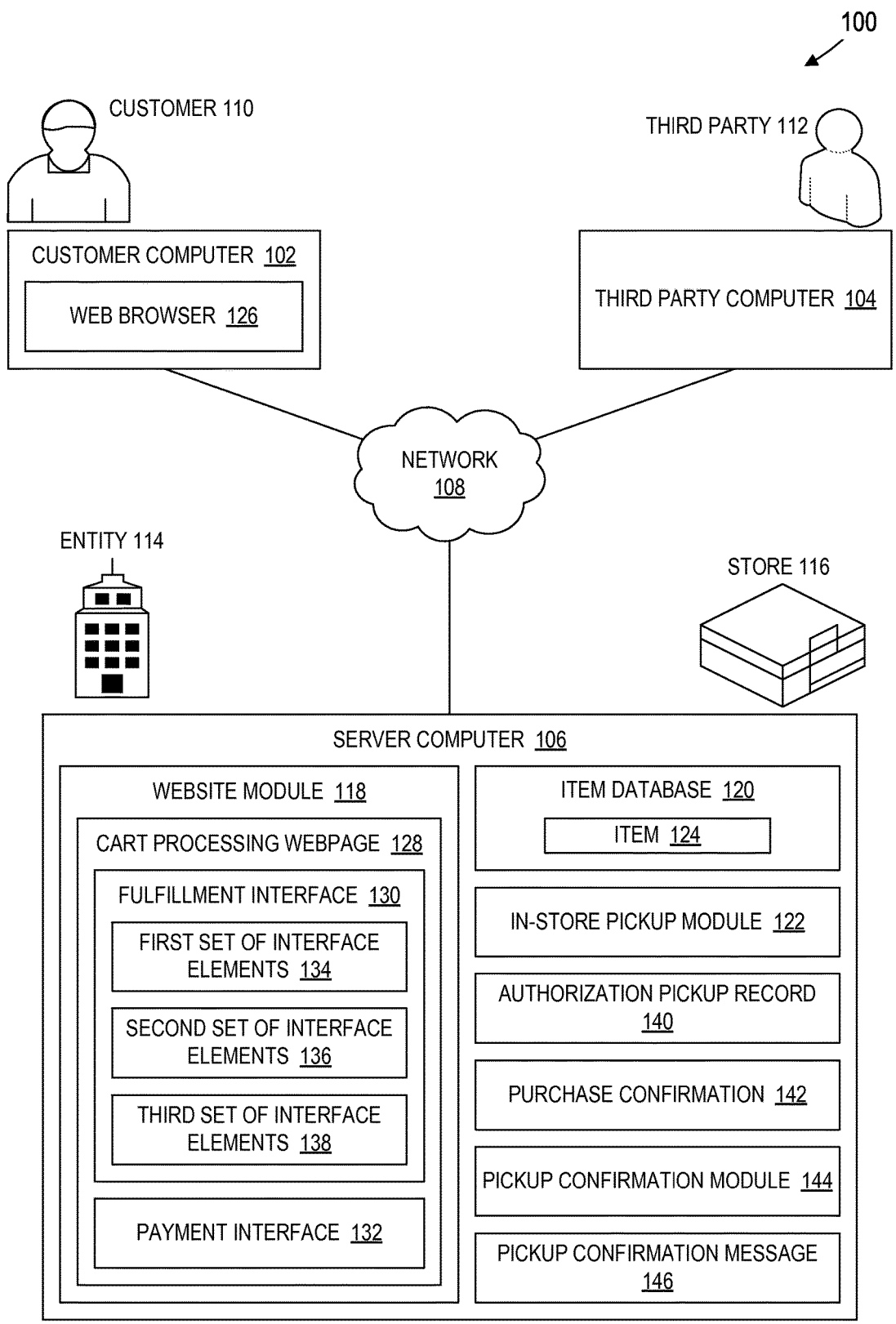
FIG. 1 is a simplified network architecture configured to facilitate authorized in-store pickup in conjunction with online ordering, in accordance with some embodiments presented herein.

In the following detailed description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the present disclosure, as generally described herein, and illustrated in the Figures can be arranged, substituted, combined, separated, and designed in a wide variety of different configurations, all of which are explicitly contemplated herein.

This disclosure is drawn, inter alia, to methods, systems, and computer-readable media configured to facilitate authorized in-store pickup in conjunction with online ordering and/or to facilitate store-to-store pickup when items are not available in one store but may be available in one or more other stores. In an illustrative example of authorized in-store pickup, a customer may access a merchant's website through a web browser executing on the customer's computer. Through the merchant's website, the customer may browse items offered by the merchant and place selected items in a digital shopping cart. When the customer has completed her order and is ready to check out, the merchant's website may transform to a processing webpage that includes a fulfillment interface and a payment interface.

The fulfillment interface may provide multiple options for fulfilling the customer's order. Such options may include delivery to the customer's address, in-store pickup by the customer, and/or in-store pickup by a third party authorized by the customer. If the customer selects the option for in-store pickup by a third party, then the fulfillment interface may prompt the customer to enter identifying information regarding the third party. The delivery interface may also prompt the customer to enter pickup details associated with the pickup of the selected items. Such pickup details may include a preferred store location, the pickup date, and/or the pickup time. The fulfillment interface may further prompt the customer to enter a preferred notification method in which the merchant can communicate with the third party. The payment interface may prompt the customer to enter payment information, such as credit card information or PAYPAL credentials, for purchasing the selected items.

When the customer has completed entering the requisite information in the fulfillment interface and the payment interface, the customer may submit the completed order for processing through the merchant's website. In addition to processing the payment information, the merchant's website may also generate an authorization pickup record for the third party and a purchase confirmation for the customer.

The authorization pickup record may be provided to the third party via the preferred notification method. The authorization pickup record may include verification data enabling the third party to verify that she is authorized on behalf of the customer to pick up the purchased items. For example, the verification data may include a unique bar code that can be scanned by a store employee or automated system to verify that the third party is authorized. The authorization pickup record may also include relevant information associated with the pickup, such as customer information, the location of the store, the pickup date, the pickup time, the purchased items to be picked up, the size and weight of the purchased items, and/or driving directions to the store.

The purchase confirmation may confirm that the customer's purchase has been processed. The purchase confirmation may also confirm the fulfillment option selected by the customer. For example, the purchase confirmation may include at least some of the information provided to the third party in the authorization pickup record. The purchase confirmation may be provided to the customer through a web page on the merchant's website, an email to the customer, and/or some other suitable communication method.

In an example of store-to-store pickup, a customer may be shopping at a primary store. While shopping at the primary store, the customer may discover that one or more items on her shopping list are not available or out-of-stock at the primary store. The customer may visit the customer service desk at the primary store. At the customer service desk, a store employee may access a store-to-store module provided by a store computer. Through the store-to-store module, the store employee may enter one or more product identifiers (e.g., stock-keeping units, universal product codes, etc.) associated with items.

Upon receiving the product identifiers, the store-to-store module may locate one or more alternate stores that contain one or more of the items and generate an ordered list of the alternate stores. The ordered list may be ordered by percentage match (i.e., the stores that contain the highest percentage of the items) and/or the shortest distance between the alternate stores and the primary store. The store computer may be coupled to a printer configured to print out the ordered list in an inventory ticket. Alternatively, the store computer may be configured to transmit the inventory ticket electronically to the customer (e.g., through the customer's mobile device via the Internet).

The inventory ticket may include various information regarding the product identifiers and the alternate stores. For example, the inventory ticket may include a listing of the alternate stores according to the ordered list. Under each alternate store, the inventory ticket may further include a listing of each item by name and product identifier, a quantity available of each item in the respective alternate store, and/or location information (e.g., aisle, bay, etc.) of each item in the respective alternate store. Additionally, the listing of the alternate stores may include relevant store information, such as the store number, the store address, and/or the store phone number.

The customer may utilize the inventory ticket to visit one or more of the alternate stores in order to locate the items associated with the product identifiers. Alternatively, the primary store may schedule a pick-up by the customer or an authorized third party (e.g., as described herein). The store computer may be a desktop computer, laptop computer, or mobile device.

The store-to-store module may also include functionality whereby a customer can schedule in-store pickup of the items on the inventory ticket. The customer can schedule in-store pickup by the customer, in-store pickup by an authorized third party, or drop shipment or delivery to the customer. For example, when the customer visits the customer service desk, the store employee may utilize the store-to-store module to schedule the pick-up time and, depending on the customer's preference, to obtain identifying information on the customer or the authorized third party who will perform the pick-up. If third party pick-up is selected, then the store-to-store module may transmit an authorization pickup record, as described herein, to the third party.

Scheduling a pick-up time through the store-to-store interface may be particularly useful if one or more of the items are out-of-stock at one or more of the alternate stores. For example, the store employee may utilize the store-to-store module to determine when out-of-stock products at one or more of the alternate stores will become in-stock again. Through such information, the store employee can schedule an appropriate pick-up time after the product is in-stock.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, point-of-sale computers, kiosk computers, and the like.

In the following Detailed Description, references are made to the accompanying Figures that form a part hereof, and which are shown by way of illustration, specific embodiments, or examples. FIG. 1 is a simplified network architecture 100 configured to facilitate authorized in-store pickup in conjunction with online ordering, in accordance with some embodiments presented herein. The network architecture 100 may include a customer computer 102, a third-party computer 104, and a server computer 106. The customer computer 102, the third-party computer 104, and the server computer 106 may be coupled by a communications network 108. The customer computer 102 may be associated with a customer 110. The third-party computer 104 may be associated with a third party 112. The server computer 106 may be associated with a corporate entity 114 (hereinafter "entity 114"). The entity 114 may control one or more brick-and-mortar stores, such as a store 116. It should be appreciated that the server computer 106 may be arranged in the store 116 or remote from the store 116.

The server computer 106 may include a website module 118, an item database 120, and an in-store pickup module 122. The website module 118 may provide one or more web pages configured to access the item database 120. The item database 120 may include records of multiple items, such as an item 124. The customer computer 102 may include a web browser 126. The customer 110 may utilize the web browser 126 to remotely access the website module 118 via the communications network 108. In particular, the website module 118 may enable the customer 110 to browse various items contained in the item database 120 and to select one or more items for purchase. At least some of the items found in the item database 120 and made available for purchase through the website module 118 may also be available for purchase and/or pickup at the store 116.

The website module 118 may include, among other web pages, a cart processing web page 128. The cart processing web page 128 may include a fulfillment interface 130 and a payment interface 132. When the customer 110 has selected one or more items for purchase, the website module 118 may place the selected items in a digital shopping cart. When the customer 110 has completed her order and is ready to check out, the customer 110 may cause the website module 118 to transform to the cart processing web page 128. For example, the customer 110 may select a "checkout" button on a given web page via a mouse click or a tap on a touchscreen interface. Although the fulfillment interface 130 and the payment interface 132 are illustrated in FIG. 1 as being embodied on the same web page, it should be appreciated that the fulfillment interface 130 and/or the payment interface 132 may be embodied on one or more separate web pages.

The fulfillment interface 130 may provide multiple options for fulfilling the order of the customer 110. Such options may include delivery to an address of the customer 110, in-store pickup by the customer 110, and/or in-store pickup by the third party 112 authorized by the customer 110. The option for in-store pickup by the third party 112 may be utilized when the customer 110 does not want or is unable able to pick up the purchased items. For example, if the purchased items are heavy and large, the customer 110 may not have the necessary vehicle to transport the purchased items and/or may be physically unable to carry the purchased items. In such cases, the customer 110 may designate the third party 112 to pick up the purchased items for the customer 110. For example, the third party 112 may be a friend of the customer 110 or a contractor hired by the customer 110 and not associated with the entity 114.

In an illustrative embodiment, the customer 110 selects the option for in-store pickup by the third party 112. In response to receiving the selection of the option for in-store pickup by the third party, the fulfillment interface 130 may display a first set of interface elements 134, a second set of interface elements 136, and a third set of interface elements 138. It should be appreciated that one skilled in the art may contemplate other sets of interface elements in the fulfillment interface 130 not described herein. Some examples of interface elements may include text boxes, radio buttons, drop-down menus, and/or check boxes.

The first set of interface elements 134 may prompt the customer 110 to enter identifying information regarding the third party 112. Some example identifying information may include the name of the third party 112, an email address of the third party 112, and/or a telephone number of the third party 112. It should be appreciated that some of the information (e.g., telephone number) obtained from the third party 112 may be personal, sensitive, or otherwise confidential by its nature. In such instances, the fulfillment interface 130 may allow the third party 112 to opt out of providing such information and/or offer the third party 112 options to provide other identifying information.

The second set of interface elements 136 may prompt the customer 110 to enter pickup details associated with the pickup of the selected items. Some example pickup details may include a preferred store location (e.g., if the entity 114 controls multiple brick-and-mortar stores), a pickup date, a pickup time, and/or a secret question-answer combination. The third set of interface elements 138 may prompt the customer 110 to enter a preferred notification method in which the entity 114 can communicate with the third party 112. Some example notification methods may include text message and/or email. The payment interface 132 may prompt the customer 110 to enter payment information, such as credit card information or PAYPAL credentials, for purchasing the selected items.

When the customer 110 has completed entering the requisite information in the fulfillment interface 130 and the payment interface 132, the customer 110 may submit the completed order for processing through the website module 118. In addition to processing the payment information, the website module 118 may also generate an authorization pickup record 140 for the third party 112 and a purchase confirmation 142 for the customer 110.

The authorization pickup record 140 may be provided to the third party 112 via the preferred notification method entered by the customer 110 in the fulfillment interface 130. For example, if the preferred notification method is text message and the third-party computer 104 is a smartphone device, then the website module 118 may transmit the authorization pickup record 140 via short message service ("SMS") to the telephone number associated with the smartphone device. In some embodiments, the authorization pickup record 140 may include verification data enabling the third party 112 to verify at the store 116 that she is authorized on behalf of the customer 110 to pick up the purchased items. In one example, the verification data may include a unique bar code that can be scanned by an employee of the store 116 or by an automated system at the store 116 to verify that the third party 112 is authorized. In another example, the verification data may include the secret question-answer combination entered by the customer 110 in the fulfillment interface 130. In this example, when the third party 112 picks up the purchased items at the store, an employee of the store 116 or an automated system at the store 116 may ask the third party 112 to provide the correct answer to the question in the secret question-answer combination. The authorization pickup record 140 may also include relevant information associated with the pickup, such as information regarding the customer 110, the location of the store 116, the pickup date, the pickup time, the purchased items to be picked up, the size and weight of the purchased items, and/or driving directions to the store 116.

The purchase confirmation 142 may confirm that the customer's purchase has been processed. The purchase confirmation 142 may also confirm the fulfillment option selected by the customer 110. For example, the purchase confirmation 142 may include at least some of the information provided to the third party 112 in the authorization pickup record 140. The purchase confirmation 142 may be provided to the customer 110 through a web page, an email to the customer 110, or some other suitable communication method.

In some embodiments, the server computer 106 may also include a pickup confirmation module 144. When the third party 112 picks up the purchased items at the store 116, the pickup confirmation module 144 may provide a pickup confirmation message 146 to the customer 110 via a text message, an email, or some other suitable communication method. For example, the pickup confirmation module 144 may be configured to transmit the pickup confirmation message 146 to the customer 110 in response to an employee of the store 116 or an automated system at the store 116 scanning the unique bar code contained in the authorization pickup record 140.

Figure 2:
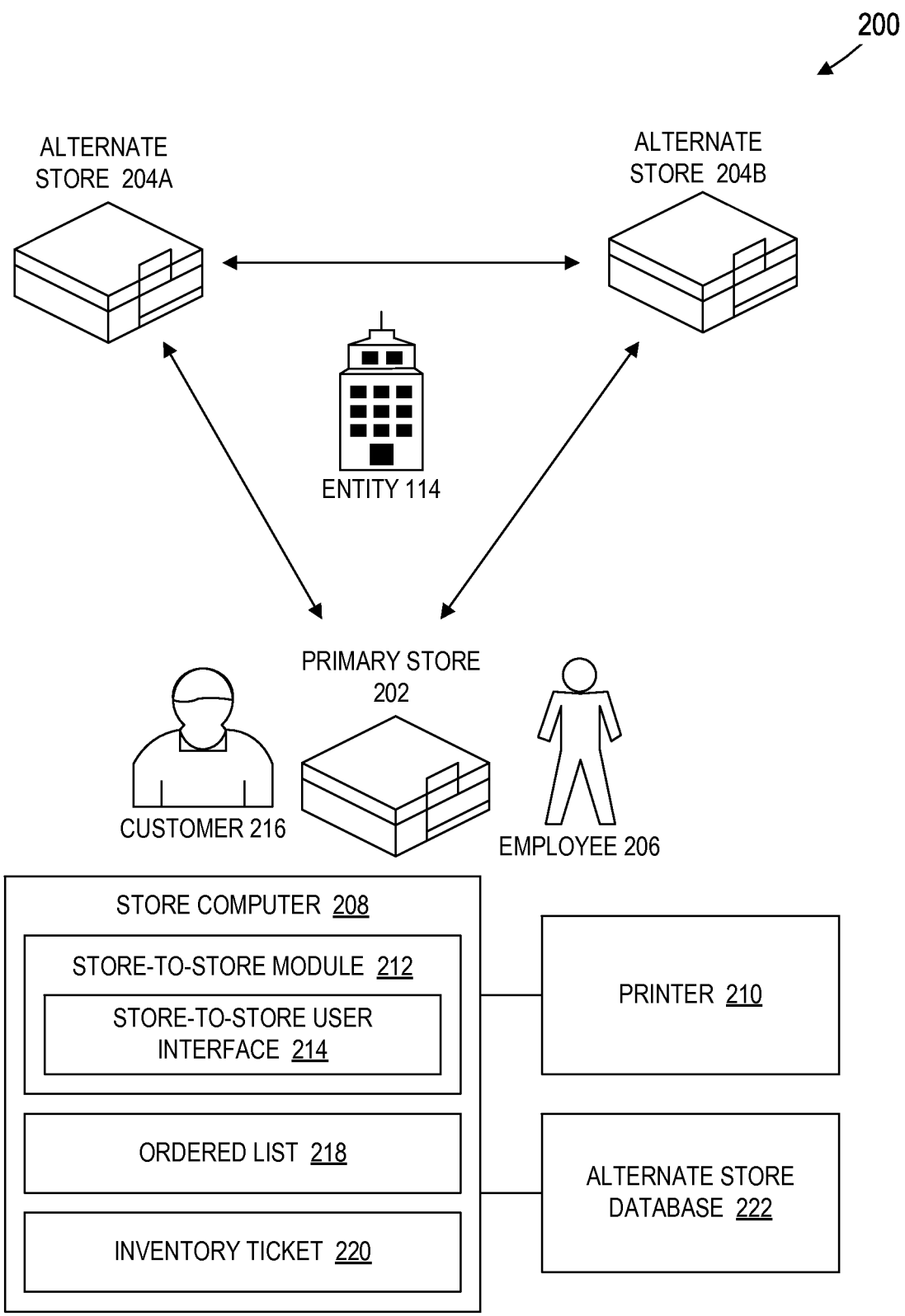
FIG. 2 is a simplified network architecture configured to facilitate store-to-store pickup when items are not available in one store but may be available in one or more other stores, in accordance with some embodiments presented herein.

FIG. 2 is a simplified network architecture 200 configured to facilitate store-to-store pickup when items are not available in one store but may be available in one or more other stores, in accordance with some embodiments presented herein. The network architecture 200 may include a primary store 202, a first alternate store 204A, and a second alternate store 204B. The primary store 202 and the alternate stores 204A-204B (collectively "alternate stores 204") may be controlled by the entity 114. An employee 206 may work in the primary store 202A and may have access to a store computer 208 and a printer 210 coupled to the store computer 208. The store computer 208 may be configured to execute a store-to-store module 212. When executed by the store computer 208, the store-to-store module 212 may be configured to provide a store-to-store user interface 214.

In an illustrative embodiment, a customer 216 may visit the primary store 202 in order to purchase items in a shopping list. While shopping at the primary store 202, the customer 216 may discover that one or more items in the shopping list are not available or out-of-stock at the primary store 202. These items that are not available or out-of-stock at the primary store 202 may be referred to herein as missing items. The customer 216 may visit a customer service desk at the primary store 202. In particular, the customer service desk may include the store computer 208, and the employee 206 may work at the customer service desk.

At the request of the customer 216, the employee 206 may enter, through the store-to-store user interface 214, one or more product identifiers associated with the missing items. Some example product identifiers may include stock-keeping units ("SKUs") or universal product codes ("UPCs"). In some cases, the customer 216 may not have such product identifiers available. For example, the customer 216 may have only the names and/or descriptions of the missing items. In such cases, the store-to-store user interface 214 may include a look-up function through which the employee 206 can retrieve the product identifiers by the names or other suitable characteristics of the missing items.

Upon receiving the product identifiers through the store-to-store user interface 214, the store-to-store module 212 may be configured to locate one or more alternate stores, such as the alternate stores 204, that contain one or more of the missing items and generate an ordered list 218 of the alternate stores. In some embodiments, the ordered list 218 may be ordered by percentage match. That is, the stores that contain a higher percentage of the missing items. In some other embodiments, the ordered list 218 may be ordered by the shortest distance between the alternate stores 204 and the primary store 202. For example, if the primary store 202 is closer to the first alternate store 204A than the second alternate store 204B, the first alternate store 204A may be ranked higher than the second alternate store 204B in the ordered list 218. In yet some other embodiments, the ordered list 218 may be ordered by both the percentage match and the shortest distance.

The store-to-store module 212 may be configured to generate an inventory ticket 220 based on the ordered list 218. The inventory ticket 220 may include various information regarding the product identifiers and the alternate stores. For example, the inventory ticket 220 may include a listing of the alternate stores 204 according to the ordered list 218. Under each alternate store, the inventory ticket 220 may further include a listing of each missing item by name and product identifier, a quantity available of each item in the respective alternate store, and/or location information (e.g., aisle number, bay number, etc.) of each item in the respective alternate store. Additionally, the listing of the alternate stores 204 may include relevant store information, such as the store number, the store address, and/or the store phone number.

The information contained in the inventory ticket 220 may be retrieved from a local or remote database, such as an alternate store database 222. In a local implementation, the alternate store database 222 may be located in the primary store 202. In a remote implementation, the alternate store database 222 may reside at a central location and may serve multiple stores controlled by the entity 114 including the primary store 202.

The employee 206 may print a physical copy of the inventory ticket 220 using the printer 210 and provide the physical copy to the customer 216. Alternatively or additionally, the store-to-store module 212 may be configured to transmit the inventory ticket 220 electronically to the customer 216. For example, the store-to-store module 212 may transmit the inventory ticket 220 to a mobile device or email address associated with the customer 216 via the Internet.

The customer 216 may utilize the inventory ticket 220 to visit one or more of the alternate stores 204 in order to locate the missing items. Alternatively, the primary store 202 may schedule a pick-up by the customer 216 or an authorized third party (e.g., as described herein). The store computer 208 may be a desktop computer, laptop computer, or mobile device.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the Figures and described herein. These operations may also be performed in a different order than those described herein.

Figure 3:
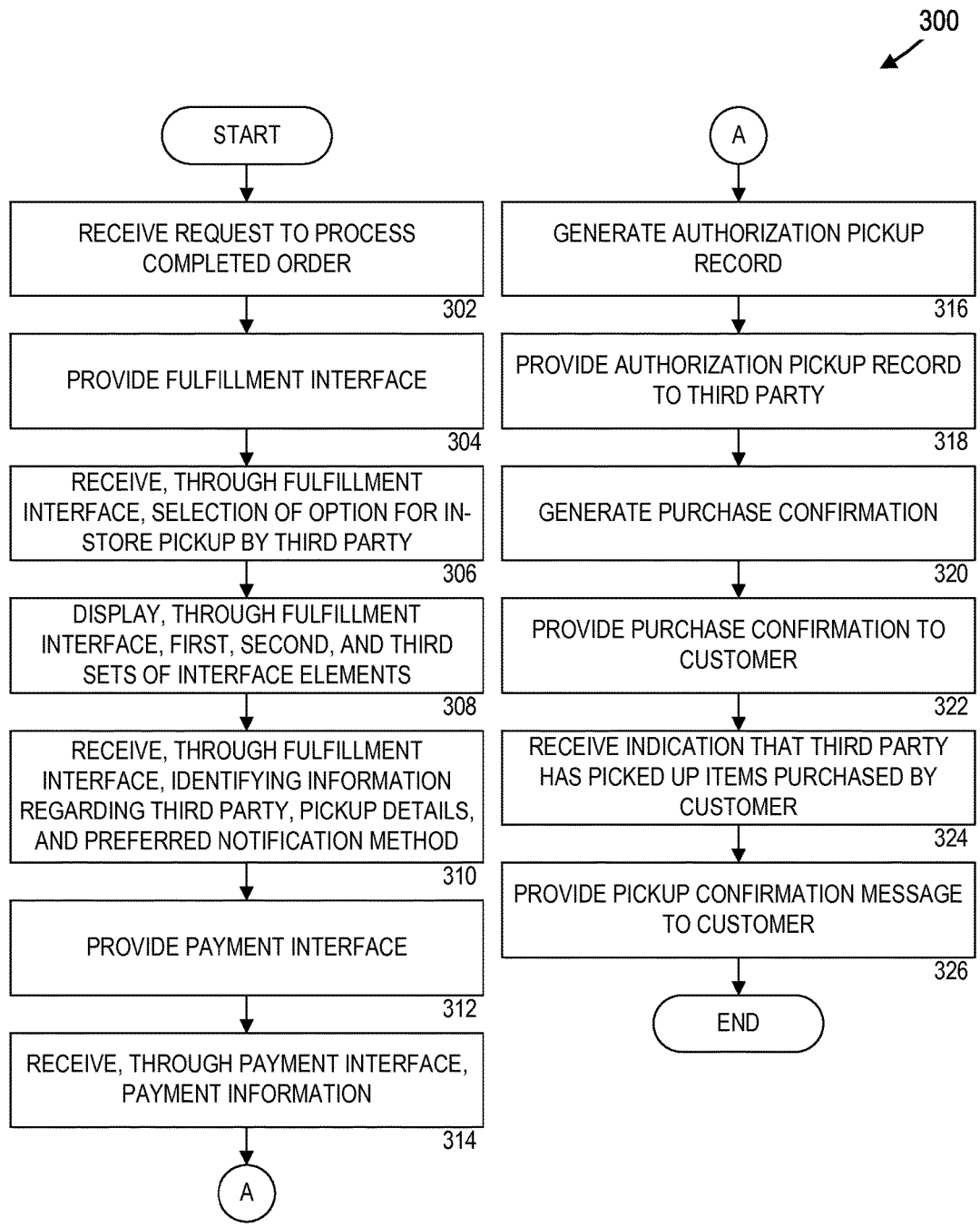
FIG. 3 is a flow diagram illustrating an example process for facilitating authorized in-store pickup in conjunction with online ordering, in accordance with some embodiments presented herein.

Referring now to FIG. 3, additional details regarding the operation of the website module 118 and the pickup confirmation module 144 will be provided. In particular, FIG. 3 is a flow diagram illustrating an example process 300 for facilitating authorized in-store pickup in conjunction with online ordering, in accordance with some embodiments presented herein. The website module 118 and/or the pickup confirmation module 144 may be configured to perform one or more operations 302-326 in the process 300.

In FIG. 3, the process 300 begins at operation 302, where the website module 118 may receive a request to process a completed order. For example, the customer 110 may access, via the web browser 126, various web pages provided by the website module 118 in order to browse items contained in the item database 120 and to place selected items in a digital shopping cart. When the customer 110 has completed her order and is ready to check out, the customer 110 may provide the request to process the completed order. For example, the customer 110 may provide the request to process the completed order by selecting a "checkout" button on a given web page. After operation 302, the process 300 may proceed to operation 304.

At operation 304, the website module 118 may provide the fulfillment interface 130 through a web page, such as the cart processing web page 128. The fulfillment interface 130 may provide multiple options for fulfilling the order of the customer 110. Such options may include delivery to the address of the customer 110, in-store pickup by the customer 110, and/or in-store pickup by the third party 112 authorized by the customer 110. After operation 304, the process 300 may proceed to operation 306.

At operation 306, the website module 118 may receive a selection of the option for in-store pickup by the third party 112. Through the fulfillment interface 130, the customer 110 may select one of the options for fulfilling the order of the customer 110. In an illustrative embodiment described with respect to FIG. 3, the customer 110 has selected the option for in-store pickup by the third party 112. After operation 306, the process 300 may proceed to operation 308.

At operation 308, the website module 118 may display, through the fulfillment interface 130, the first set of interface elements 134, the second set of interface elements 136, and the third set of interface elements 138. As previously described, the first set of interface elements 134 may prompt the customer 110 to enter identifying information regarding the third party 112. The second set of interface elements 136 may prompt the customer 110 to enter pickup details associated with the pickup of the selected items. The third set of interface elements 138 may prompt the customer 110 to enter a preferred notification method in which the entity 114 can communicate with the third party 112. After operation 308, the process 300 may proceed to operation 310.

At operation 310, the website module 118 may receive the identifying information regarding the third party 112, the pickup details associated with the pickup of the selected items, and the preferred notification method from the customer 110 via the first set of interface elements 134, the second set of interface elements 136, and the third set of interface elements 138, respectively. Some example identifying information may include the name of the third party 112, an email address of the third party 112, and/or a telephone number of the third party 112. Some example pickup details may include a preferred store location, a pickup date, a pickup time, and/or a secret question-answer combination. Some example notification methods may include text message and/or email. After operation 310, the process 300 may proceed to operation 312.

At operation 312, the website module 118 may provide the payment interface 132 through a web page, such as the cart processing web page 128. The payment interface 132 may prompt the customer 110 to enter payment information, such as a credit card number or PAYPAL credentials, for purchasing the selected items. After operation 312, the process 300 may proceed to operation 314. At operation 314, the website module 118 may receive the payment information entered by the customer 110 through the payment interface 132. After operation 314, the process 300 may proceed to operation 316.

At operation 316, the website module 118 may generate authorization pickup record 140 for the third party 112. In some embodiments, the authorization pickup record 140 may include verification data enabling the third party 112 to verify at the store 116 that she is authorized on behalf of the customer 110 to pick up the purchased items. For example, the authorization pickup record 140 may include a unique bar code. The authorization pickup record 140 may also include relevant information associated with the pickup, such as information regarding the customer 110, the location of the store 116, the pickup date, the pickup time, the purchased items to be picked up, the size and weight of the purchased items, and/or driving directions to the store 116. After operation 316, the process 300 may proceed to operation 318.

At operation 318, the website module 118 may provide the authorization pickup record 140 to the third party 112. In particular, the website module 118 may provide the authorization pickup record 140 to the third party 112 via the preferred notification method entered by the customer 110 in the fulfillment interface 130. After operation 318, the process 300 may proceed to operation 320.

At operation 318, the website module 118 may generate the purchase confirmation 142 for the customer 110. The purchase confirmation 142 may confirm that the customer's purchase has been processed. The purchase confirmation 142 may also confirm the fulfillment option selected by the customer 110. For example, the purchase confirmation 142 may include at least some of the information provided to the third party 112 in the authorization pickup record 140. After operation 320, the process 300 may proceed to operation 322.

At operation 322, the website module 118 may provide the purchase confirmation 142 to the customer 110. In particular, the website module 118 may provide the purchase confirmation 142 to the customer 110 through a web page, an email to the customer 110, or some other suitable communication method. After operation 322, the process 300 may proceed to operation 324.

At operation 324, the pickup confirmation module 144 may receive an indication that the third party 112 has picked up the items purchased by the customer 110. For example, when the third party 112 visits the store 116 to pick up the purchased items, the third party 112 may provide a copy of a unique bar code contained in the authorization pickup record 140. An employee of the store 116 may utilize a suitable scanning device to scan the unique bar code in order to verify that the third party 112 is authorized. In response to verifying that the third party 112 is authorized, the scanning device may transmit the indication the third party 112 has picked up the purchased items to the pickup confirmation module 144. After operation 324, the process 300 may proceed to operation 326.

At operation 326, the pickup confirmation module 144 may provide the pickup confirmation message 146 to the customer 110 in response to receiving the indication that the third party 112 has picked up the items purchased by the customer 110. In particular, the pickup confirmation module 144 may transmit the pickup confirmation message 146 to the customer 110 via a text message, an email, or some other suitable communication method. After operation 326, the process 300 may either repeat (e.g., periodically, continuously, or on demand as needed) or terminate.

Figure 4:
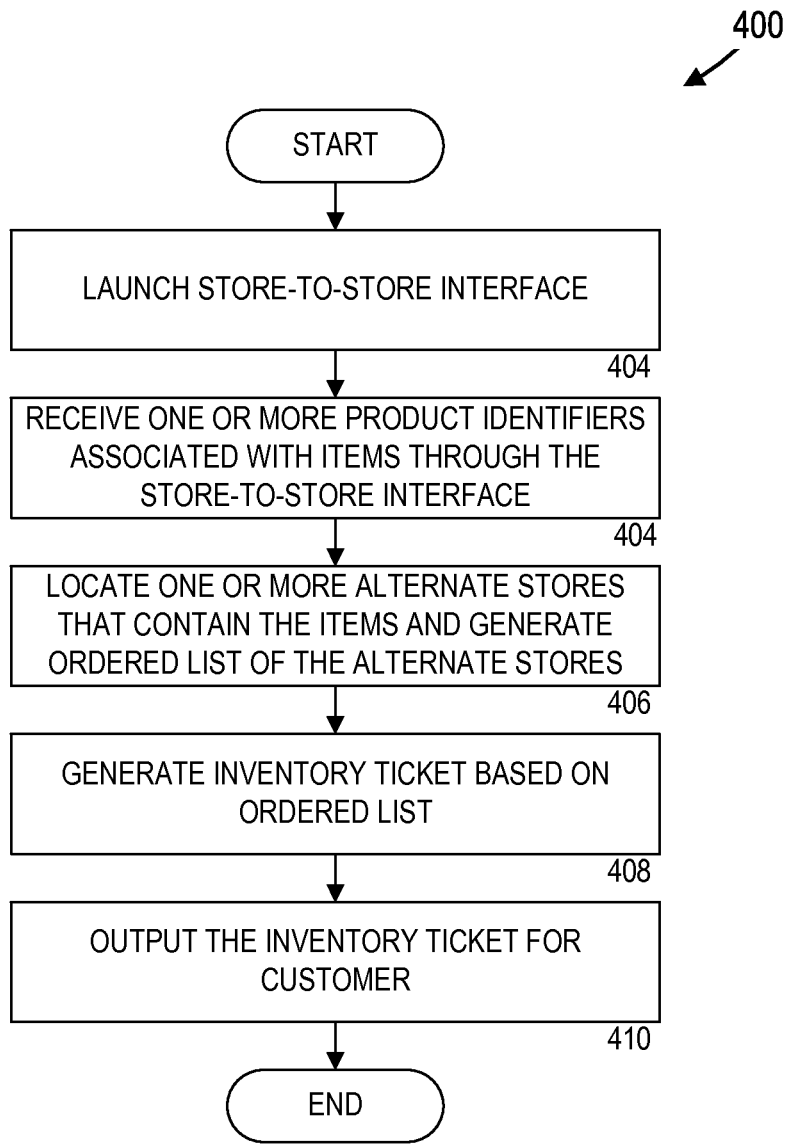
FIG. 4 is a flow diagram illustrating an example process for facilitating store-to-store pickup when items are not available in one store but may be available in one or more other stores, in accordance with some embodiments presented herein.

Referring now to FIG. 4, additional details regarding the operation of the store-to-store module 212 will be provided. In particular, FIG. 4 is a flow diagram illustrating an example process 400 for facilitating store-to-store pickup when items are not available in one store but may be available in one or more other stores, in accordance with some embodiments presented herein. The store-to-store module 212 may be configured to perform one or more operations 402-410 in the process 400.

In FIG. 4, the process 400 begins at operation 402, where the store-to-store module 212 may launch the store-to-store user interface 214. In one example, the store-to-store module 212, when executed, may automatically launch the store-to-store user interface 214. In another example, the employee 206 may cause the store-to-store module 212 to launch through some interface element provided by the store-to-store module 212. After operation 402, the process 400 may proceed to operation 404.

At operation 404, the store-to-store module 212 may receive one or more product identifiers associated with various items through the store-to-store user interface 214. As previously described, product identifiers may include SKUs or UPCs. In some instances, the store-to-store module 212 may provide a look-up function for retrieving corresponding product identifiers based on names or other suitable characteristics of the items. After operation 404, the process 400 may proceed to operation 406.

At operation 406, the store-to-store module 212 may locate one or more alternate stores, such as the alternate stores 204, that contain one or more of the missing items and generate the ordered list 218 of the alternate stores. The store-to-store module 212 may rank the alternate stores based on percentage match, shortest distance to the primary store, and/or other suitable criteria. After operation 406, the process 400 may proceed to operation 408.

At operation 408, the store-to-store module 212 may generate the inventory ticket 220 based on the ordered list 218. Such inventory ticket 220 may be displayed to the employee 206 through the store-to-store user interface 214. In an illustrative example, the inventory ticket 220 may include a ranked list of the alternate stores. Under each alternate store, the inventory ticket 220 may further include a listing of each missing item by name and product identifier, a quantity available of each item in the respective alternate store, location information (e.g., aisle number, bay number, etc.) of each item in the respective alternate store, relevant store information, the store address, and/or the store phone number. After operation 406, the process 400 may proceed to operation 410.

At operation 410, the store-to-store module 212 may output the inventory ticket 220 for the customer 216. In some embodiments, the store-to-store module 212 may print a physical copy of the inventory ticket 220 using the printer 210. In this case, the employee 206 can manually hand the printed copy to the customer 216. In some other embodiments, the store-to-store module 212 may transmit the inventory ticket 220 to a mobile device or email address associated with the customer 216 via the Internet. After operation 410, the process 400 may either repeat (e.g., periodically, continuously, or on demand as needed) or terminate.

Figure 5:
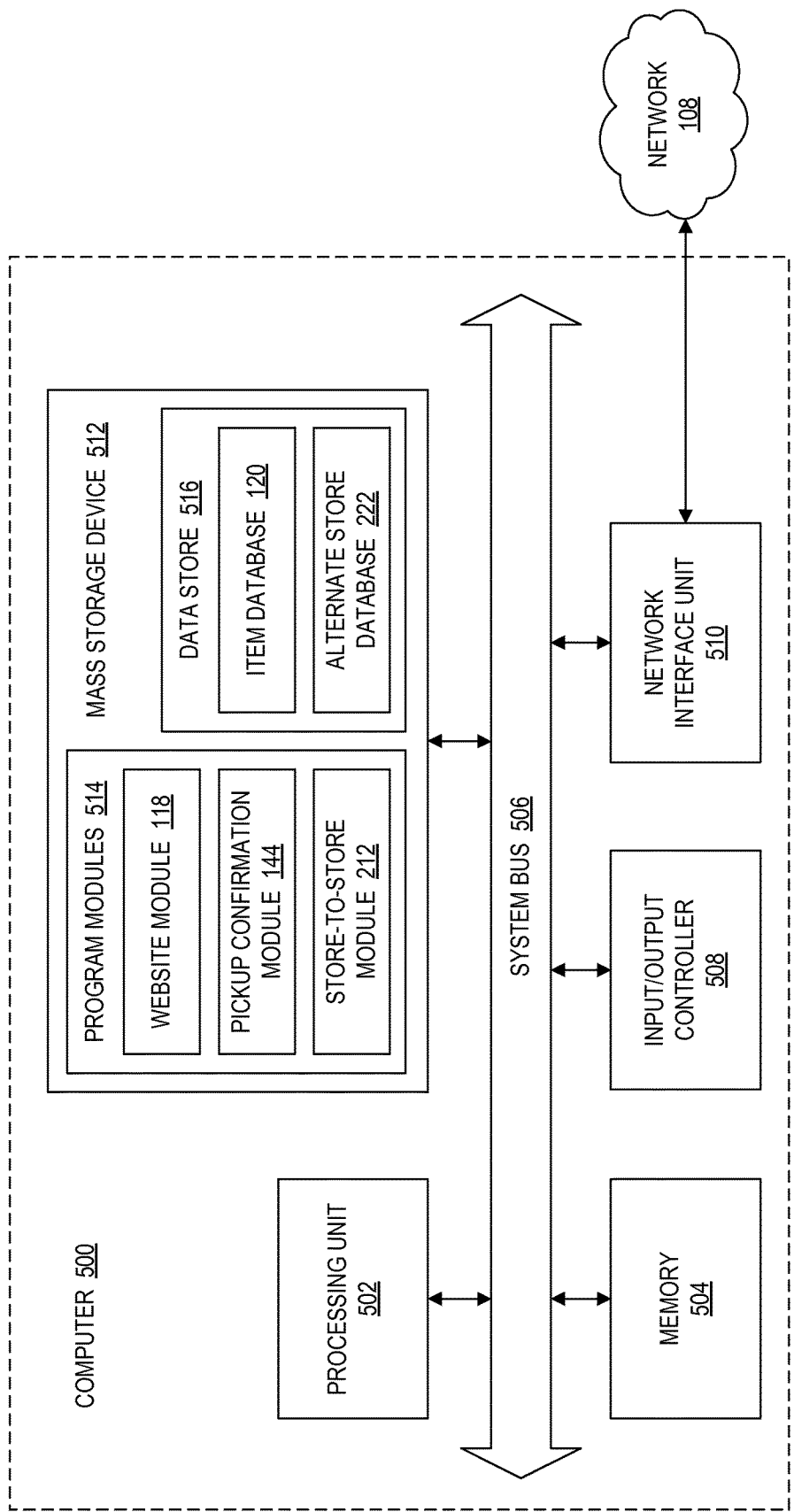
FIG. 5 is a computer architecture diagram showing an illustrative computer hardware architecture for a computing system capable of implementing the embodiments presented herein.

FIG. 5 is an example computer architecture diagram illustrating a computer 500, in accordance with some embodiments presented herein. Some examples of the computer 500 may include the customer computer 102, the third-party computer 104, the server computer 106, and the store computer 208. The computer 500 may include a central processing unit 502, a system memory 504, and a system bus 506 that couples the memory 504 to the central processing unit 502. The computer 500 may further include a mass storage device 512 for storing one or more program modules 514 and a data store 516. Some examples of the program modules 514 may include the website module 118, the pickup confirmation module 144, and the store-to-store module 212. Some examples of the data store 516 may include the item database 120 and the alternate store database 222. The mass storage device 512 may be connected to the central processing unit 502 through a mass storage controller (not shown) connected to the bus 506. The mass storage device 512 and its associated computer-readable storage media may provide non-volatile storage for the computer 500. Although the description of computer-readable storage media contained herein refers to a mass storage device, such as a hard disk or CD-ROM drive, it should be appreciated by those skilled in the art that computer-readable storage media can be any available computer storage media that can be accessed by the computer 500.

By way of example, and not limitation, computer-readable storage media may include volatile and non-volatile, removable and non-removable media implemented in any method or technology for the storage of information such as computer-executable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

The term "storage media" as used herein refers to any non-transitory media that store data and/or instructions that cause a machine to operate in a specific fashion. Storage media is distinct from but may be used in conjunction with "transmission media." Transmission media include coaxial cables, copper wire and fiber optics, among others, including the wires that comprise at least some embodiments of the bus 506. Transmission media can also take the form of acoustic or light waves, such as those generated during radio frequency and infrared data communications.

According to various embodiments, the computer 500 may operate in a networked environment using logical connections to remote computers through a network, such as the communications network 108. The computer 500 may connect to the communications network 108 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. The input/output controller 508 may also be configured to receive user input via gestures, tap/touch (e.g., via a touchscreen), and/or voice. Similarly, the input/output controller 508 may provide output to a display or other type of output device (not shown).

The bus 506 may enable the central processing unit 502 to read code and/or data to/from the mass storage device 512 or other computer-readable storage media. The computer-readable storage media may represent apparatus in the form of storage elements that are implemented using any suitable technology, including but not limited to semiconductors, magnetic materials, optics, or the like. The computer-readable storage media may represent memory components, whether characterized as RAM, ROM, flash, or other types of technology. The computer-readable storage media may also represent secondary storage, whether implemented as hard drives or otherwise. Hard drive implementations may be characterized as solid state, or may include rotating media storing magnetically-encoded information.

The program modules 514 may include software instructions that, when loaded into the central processing unit 502 and executed, cause the computer 500 to generate field sets. The program modules 514 may also provide various tools or techniques by which the computer 500 may participate within the overall systems or operating environments using the components, flows, and data structures discussed throughout this description. For example, the program modules 514 may implement interfaces for generating field sets.

In general, the program modules 514 may, when loaded into the central processing unit 502 and executed, transform the central processing unit 502 and the overall computer 500 from a general-purpose computing system into a special-purpose computing system customized to generate field sets. The central processing unit 502 may be constructed from any number of transistors or other discrete circuit elements, which may individually or collectively assume any number of states. More specifically, the central processing unit 502 may operate as a finite-state machine, in response to executable instructions contained within the program modules 514. These computer-executable instructions may transform the central processing unit 502 by specifying how the central processing unit 502 transitions between states, thereby transforming the transistors or other discrete hardware elements constituting the central processing unit 502.

Encoding the program modules 514 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-readable storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that concepts and technologies for the facilitation of authorized in-store pickup in conjunction with online ordering are presented herein. It should further be appreciated that concepts and technologies for the facilitation of store-to-store pickup when items are not available in one store but may be available in one or more other stores are also presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for facilitating authorized in-store pickup in conjunction with online ordering, the method comprising:
    receiving a request to process an order placed through a website, the order comprising an item selected by a customer;
    responsive to receiving the request, providing a cart processing web page for the customer, the cart processing web page comprising a fulfillment interface;
    receiving, through the fulfillment interface from the customer, a selection of an option for in-store pickup by a third party;
    receiving, through the fulfillment interface from the customer, identifying information regarding the third party, pickup details associated with the in-store pickup of the item by the third party, and an electronic notification method for contacting the third party;
    responsive to receiving the identifying information, the pickup details, and the electronic notification method, generating an authorization pickup record related to the in-store pickup of the item by the third party, wherein the authorization pickup record comprises a unique code that verifies that the third party is authorized to pick up the item;
    electronically transmitting the authorization pickup record to the third party via the notification method;
    receiving the authorization pickup record from the third party; and
    verifying that the third party is authorized to pick up the item based on the authorization pickup record.

2. The method of claim 1, wherein the verification information comprises a unique bar code.

3. The method of claim 2, wherein verifying that the third party is authorized to pick up the item based on the authorization pickup record comprises verifying that the third party is authorized to pick up the item by scanning the unique bar code.

4. The method of claim 1, wherein the verification information comprises an answer to a secret question selected by the customer.

5. The method of claim 1, further comprising:
transmitting a pickup confirmation message to the customer after the third party picks up the item.

6. The method of claim 1, wherein the authorization pickup record further comprises one or more of:
customer information;
a location of a store selected by the user for pickup of the item;
a pickup date;
a pickup time;
information to identify the item;
the size of the item;
the weight of the item; or
directions to the store.

7. The method of claim 1, further comprising:
prompting the consumer, through the fulfillment interface, to provide identifying information regarding the third party, pickup details associated with the in-store pickup of the item by the third party, and a notification method for contacting the third party.

8. The method of claim 1, wherein verifying that the third party is authorized to pick up the item based on the authorization pickup record comprises verifying that the third party is authorized to pick up the item by scanning the unique code.

\* \* \* \* \*